United States Patent
Grobelny et al.

(10) Patent No.: US 11,418,333 B2
(45) Date of Patent: Aug. 16, 2022

(54) SYSTEM AND METHOD FOR TRUSTED CONTROL FLOW ENFORCEMENT USING DERIVED ENCRYPTION KEYS

(71) Applicant: DELL PRODUCTS, LP, Round Rock, TX (US)

(72) Inventors: Nicholas D. Grobelny, Austin, TX (US); Richard M. Tonry, Austin, TX (US); Balasingh P. Samuel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 90 days.

(21) Appl. No.: 16/739,515

(22) Filed: Jan. 10, 2020

(65) Prior Publication Data
US 2021/0218562 A1 Jul. 15, 2021

(51) Int. Cl.
*H04L 9/08* (2006.01)
*H04L 9/06* (2006.01)

(52) U.S. Cl.
CPC .......... *H04L 9/0869* (2013.01); *H04L 9/0643* (2013.01); *H04L 9/0877* (2013.01)

(58) Field of Classification Search
CPC .... H04L 9/0869; H04L 9/0877; H04L 9/0643
See application file for complete search history.

(56) References Cited

U.S. PATENT DOCUMENTS

| | | | | |
|---|---|---|---|---|
| 8,239,686 | B1* | 8/2012 | Hodzic | G06F 21/575 713/187 |
| 8,566,574 | B2* | 10/2013 | Shriver | G06F 21/575 713/189 |
| 9,026,805 | B2* | 5/2015 | Acar | H04L 9/0877 380/278 |
| 9,208,105 | B2 | 12/2015 | Joshi et al. | |
| 9,306,741 | B1 | 4/2016 | Brainard | |
| 9,311,475 | B2* | 4/2016 | Gunti | G06F 21/51 |
| 9,530,002 | B1* | 12/2016 | Hamlin | G06F 21/57 |
| 9,563,773 | B2 | 2/2017 | Barkelew et al. | |
| 9,594,918 | B1 | 3/2017 | Robinson et al. | |
| 10,146,942 | B2 | 12/2018 | Martinez et al. | |
| 2007/0127719 | A1 | 6/2007 | Selander et al. | |
| 2012/0173885 | A1* | 7/2012 | Acar | H04L 9/0877 713/193 |
| 2013/0124875 | A1* | 5/2013 | Resch | G06F 12/1408 713/189 |

(Continued)

*Primary Examiner* — Cheng-Feng Huang
(74) *Attorney, Agent, or Firm* — Larson Newman, LLP

(57) ABSTRACT

A system includes a communication channel monitor configured to calculate a hash value of a first encrypted code segment based on a measurement. A security module may derive a first encryption key using a key decryption function operation from the hash value of the first encrypted code segment. A processor decrypts the first encrypted code segment with a seed key retrieved from a storage device, and if the decryption is successful then executes the first decrypted code segment. The processor may retrieve a second one of the encrypted code segments, wherein the second encrypted code segment is a next encrypted code segment for execution after the first encrypted code segment according to a sequence of execution, decrypt the second encrypted code segment with the first encryption key, and if the decryption is successful then execute the second decrypted code segment.

20 Claims, 10 Drawing Sheets

(56) References Cited

U.S. PATENT DOCUMENTS

| | | | |
|---|---|---|---|
| 2014/0164753 A1* | 6/2014 | Lee | G06F 21/575 |
| | | | 713/2 |
| 2015/0058612 A1* | 2/2015 | Arora | G06F 21/575 |
| | | | 713/2 |
| 2016/0246964 A1 | 8/2016 | Martinez et al. | |
| 2017/0076087 A1 | 3/2017 | Hamlin et al. | |
| 2018/0004953 A1* | 1/2018 | Smith, II | G06F 21/78 |
| 2018/0041344 A1 | 2/2018 | Rahardjo et al. | |
| 2019/0034617 A1* | 1/2019 | Scarlata | G06F 9/30007 |
| 2019/0297060 A1* | 9/2019 | Iverson | H04L 9/0618 |
| 2019/0372780 A1* | 12/2019 | Messerges | H04L 63/12 |

* cited by examiner

SYSTEM AND METHOD FOR TRUSTED CONTROL FLOW ENFORCEMENT USING DERIVED ENCRYPTION KEYS

FIELD OF THE DISCLOSURE

The present disclosure generally relates to information handling systems, and more particularly relates to trusted control flow enforcement using derived encryption keys.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system includes a communication channel monitor configured to calculate a hash value of a first encrypted code segment based on a measurement. A security module may derive a first encryption key using a key decryption function operation from the hash value of the first encrypted code segment. A processor decrypts the first encrypted code segment with a seed key retrieved from a storage device, and if the decryption is successful then executes the first decrypted code segment. The processor may retrieve a second one of the encrypted code segments, wherein the second encrypted code segment is a next encrypted code segment for execution after the first encrypted code segment according to a sequence of execution, decrypt the second encrypted code segment with the first encryption key, and if the decryption is successful then execute the second decrypted code segment.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
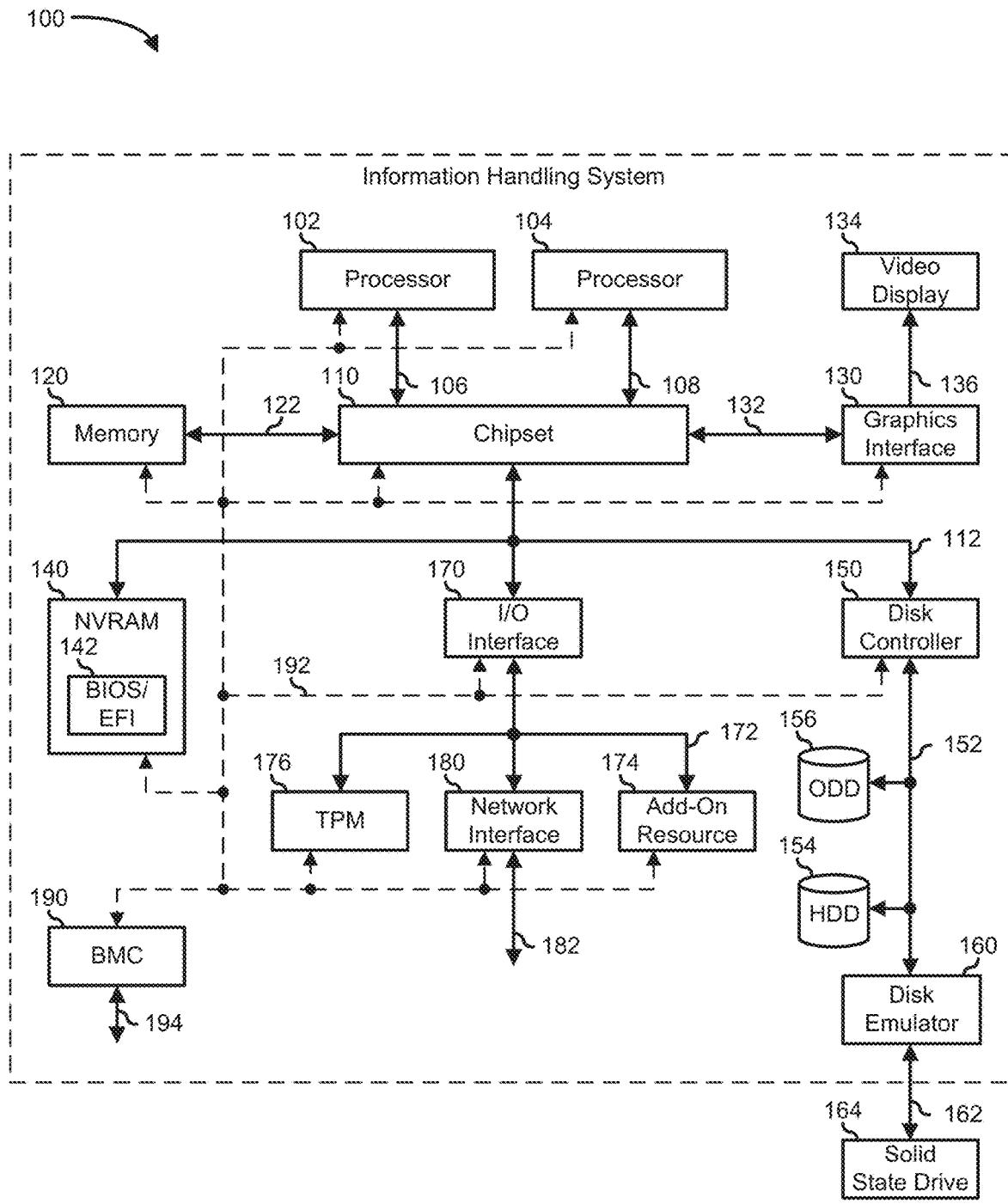
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive (ODD) 156, a solid-state drive (SSD) 164, a disk emulator 160 connected to, an external storage 166, an input/output (I/O) interface 170 connected to an add-on resource 174 and a trusted platform module 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface, a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to ODD 156, SSD 164, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits external storage 166 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, external storage 166 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For the purpose of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Verified boot technologies usually verify code integrity using a signature-based verification model. Typically, a ROM or other system memory with immutable functionality performs an initial verification and then establish a trust chain where subsequent code can be verified in sequence. The code is typically hashed and signed at build time using a private key. At runtime, the information handling system verifies the integrity of the code by re-computing the hash of the code and decrypting the signature to compare the build-calculated hash against a hash generated at runtime. If the hash of the code generated at runtime is the same as the hash of the code generated at build time, then the code is authentic, that is unaltered.

Time-of-check, time-of-use race conditions occur when between the time in which a given resource is checked, and the time that resource is used, a change occurs in the resource to invalidate the results of the check. Generally, after a section of code has been verified the section of code can be re-executed at any point as long as it is a resident in the memory. This means that the section of code that has been verified earlier is never verified again before re-execution. This allows malicious software to introduce a change in the section of code that has been verified. For example, in return-oriented programming attacks the section of code that has been verified may be reused as a "gadget" where the attacker can chain gadgets together to perform the attack. Because the section of code has been verified earlier and marked as "safe" the information handling system does not prevent the gadget from running.

Several mitigation techniques exist to prevent malicious software attacks such return-oriented programming attacks. One example is by enforcing control flow integrity, where software must follow an execution path based on a control flow graph. Enforcement typically relies on managing accesses to pointers or vectors within the code rather than restricting access to the code itself using encryption keys. Although this type of enforcement is effective against a wide range of common attacks it does not prevent exploits within the bounds of the control flow graph.

Another example of a mitigation technique is called "execute in place," where the code is executed directly from the storage rather than in copying the code to the RAM prior to execution. However, the execute in place technique places requirements on file systems that are often difficult to meet. For example, in file systems without a page table, the code stored must not be fragmented. Another example of mitigation technique is the use of a field-programmable gate array (FPGA). Some FPGAs have built-in-encryption keys which are used to decrypt an encrypted FPGA bit stream on the fly as it is read by the FPGA. To date, this technique has typically been focused on a model in which each FPGA provides a single service that is targeted to a specific application or process.

Yet another example of a mitigation technique utilizes a device identifier composition engine (DICE) for device identity and attestation. DICE generates a cryptographically unique value, called the compound device identity, for the lowest-layer of software that boots on the device. However, this mitigation technique requires that the device must be DICE compliant. In addition, because the attestation evidence is generated at boot time, malicious software may modify the device firmware at runtime after the generation of the attestation evidence.

Verification and authentication of code prior to each execution establishes a chain of trust to protect the program code and prevent malicious software from being executed. This validates the integrity of each code segment or portion of the program code and its order relative to the other portion of the program code. In addition, the current system and method is an efficient and practical solution to enforce the intended control flow because the current system and method has minimal overhead, does not require access to source code or debug information, and does not require changes to the source code.

Figure 2:
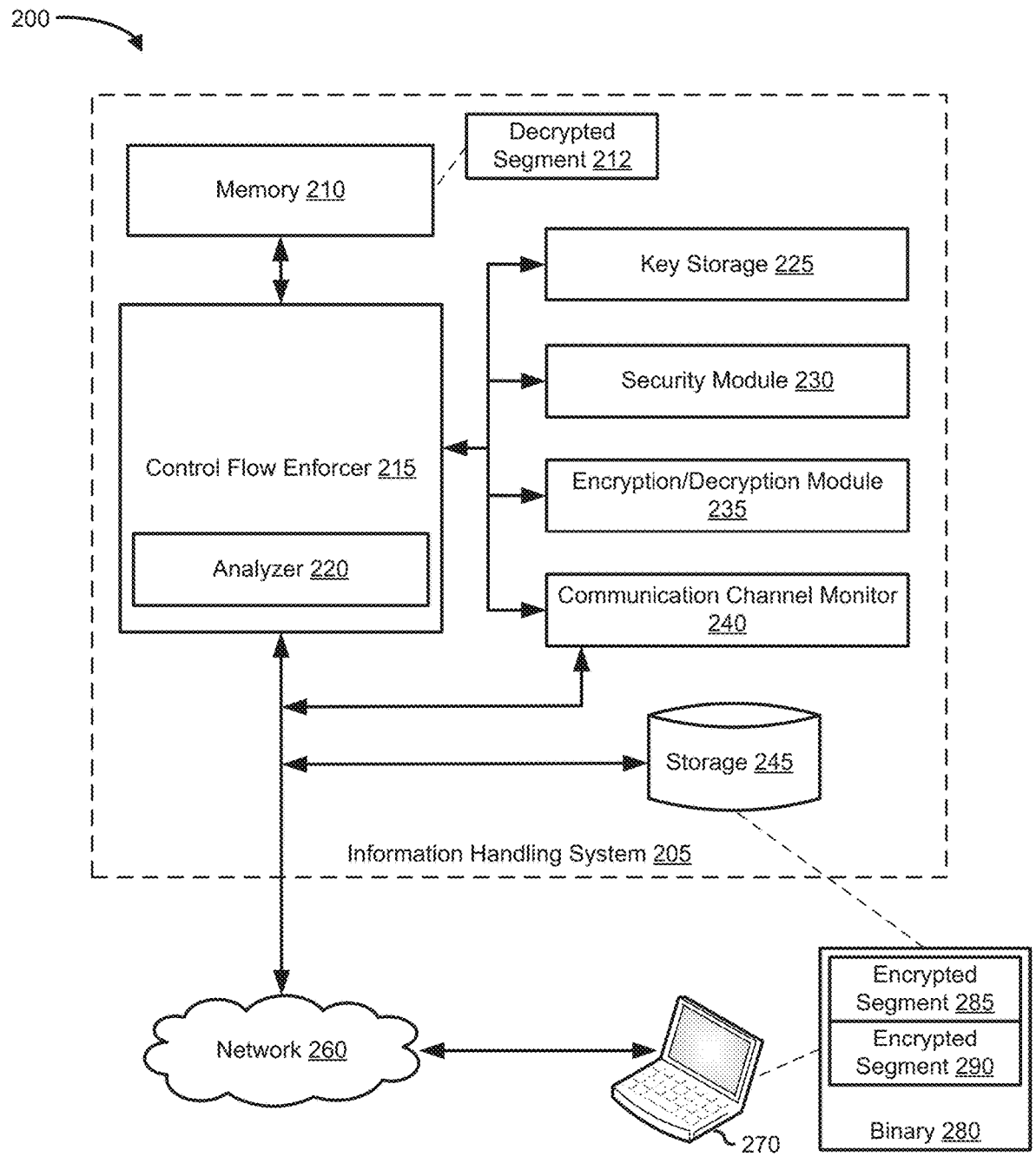
FIG. 2 is a block diagram illustrating a system for trusted control flow enforcement using derived encryption keys, according to an embodiment of the present disclosure.

FIG. 2 shows a system 200 for trusted control flow enforcement using derived encryption keys. The system 200 includes an information handling system 205, a network 260, and a client 270. Information handling system 205 is similar to information handling system 100 and includes a control flow enforcer 215, a memory 210, a key storage 225, a security module 230, an encryption/decryption module 235, a communication channel monitor 240, and a storage 245.

In system 200, to control the flow of program code, the encryption keys are derived based on the sequence in which instructions in the program code or portions thereof are executed. That is the encryption key of a current instruction is derived based on a measurement of its precursor instruction. Because the encryption keys are derived based on the sequence of execution, the encryption keys can only decrypt instructions according in the same sequence of execution, thus enforcing control flow.

Control flow enforcer 215 may be configured manage the control flow enforcement among the different components of system 200. Control flow enforcer 215 includes an analyzer 220 which may be configured to perform one or more pre-processing or post-processing functions. For example, control flow enforcer may be configured to determine whether to generate encryption keys based on ciphertext or plaintext. Analyzer 220 may also be configured to determine whether the encryption keys of the current program code was based on ciphertext or plaintext of the current program code. In addition, analyzer 220 may also be configured to keep track of the location of the current instruction relative to the other instructions in the program code. For example, analyzer 220 may determine whether the current instruction is the first instruction in the sequence.

Analyzer 220 may also be configured to determine information associated with the program code and/or the current instruction being processed. For example, compiled program code also referred to as a binary may use the "executable and linkable format," wherein a binary is divided into several segments or sections. Each segment may contain code, read-only data, and so on. Each segment may include a header that has information associated with that segment such as an address of the next segment as shown in binary 280. Analyzer 220 may be configured to parse the header to determine the address of the next segment. In this example, binary 280 is divided into two code segments, encrypted segment 285 and encrypted segment 290.

Communication channel monitor 240 may be configured to detect and measure each code segment as it passes through a communication channel such as a bus, a port, or an interface from client 270 or storage 245 to control flow enforcer 215. Storage 245 may be an NV-RAM, an SPI flash memory, an SD card, a SATA drive, a NOR flash, a NAND flash, an SSD, an HDD, or the like. As used herein, measurement is the process by which information about the code segment or the program code is collected and the hash value is calculated. The hash value may be used for verification of the integrity of the program code or the code segment. If the current measurement is different than the previous measurement, the subsequent cannot be decrypted halting execution. Communication channel monitor 240 may also be configured to calculate the hash value using a cryptographic function such as secure hash algorithm 1 (SHA-1), SHA-245, message digest (MD) 2, MD4, etc. The hash value may then be transmitted to the key derivation function.

Security module 230 may include a key derivation function which is used generate the encryption key based on one or more inputs. The key derivation function generates the same encryption key given the same input. Thus, if the code segment has been modified, the key derivation function may generate a different encryption key and would not be able to decrypt the subsequent code segment. The key derivation function may generate the encryption key based on the hash value of a code segment. In another embodiment, key derivation function may combine a precursor encryption key with another input such as a measurement of the next code segment to generate the encryption key. In yet another embodiment, the key derivation function may use a nonce value, a predefined value, a password, a salt, etc. in generating the encryption key.

The encryption key may also be referred to as a derived key or a symmetric key and stored in key storage 225. As used herein, a seed key refers to an initialization value for the key derivation function. The seed key also referred to as an initialization vector may be a randomly generated binary number by a random key generator. In another embodiment, a timestamp, a password, a function of the information handling systems service tag, or similar may be used as the seed key. The seed key may be stored in plaintext or in ciphertext at key storage 225 which may be one of various storage devices such as a trusted platform module or a section of an SPI flash memory device.

Encryption/decryption module 235 may use the encryption key to encrypt and decrypt one or more code segments. Decrypted code segments such as decrypted segment 212 may be stored in memory 210 prior to execution. The functions of encryption/decryption module 235 may be implemented as software or via an encryption-decryption card, which may be coupled to and/or accessible by the other components.

Figure 3:
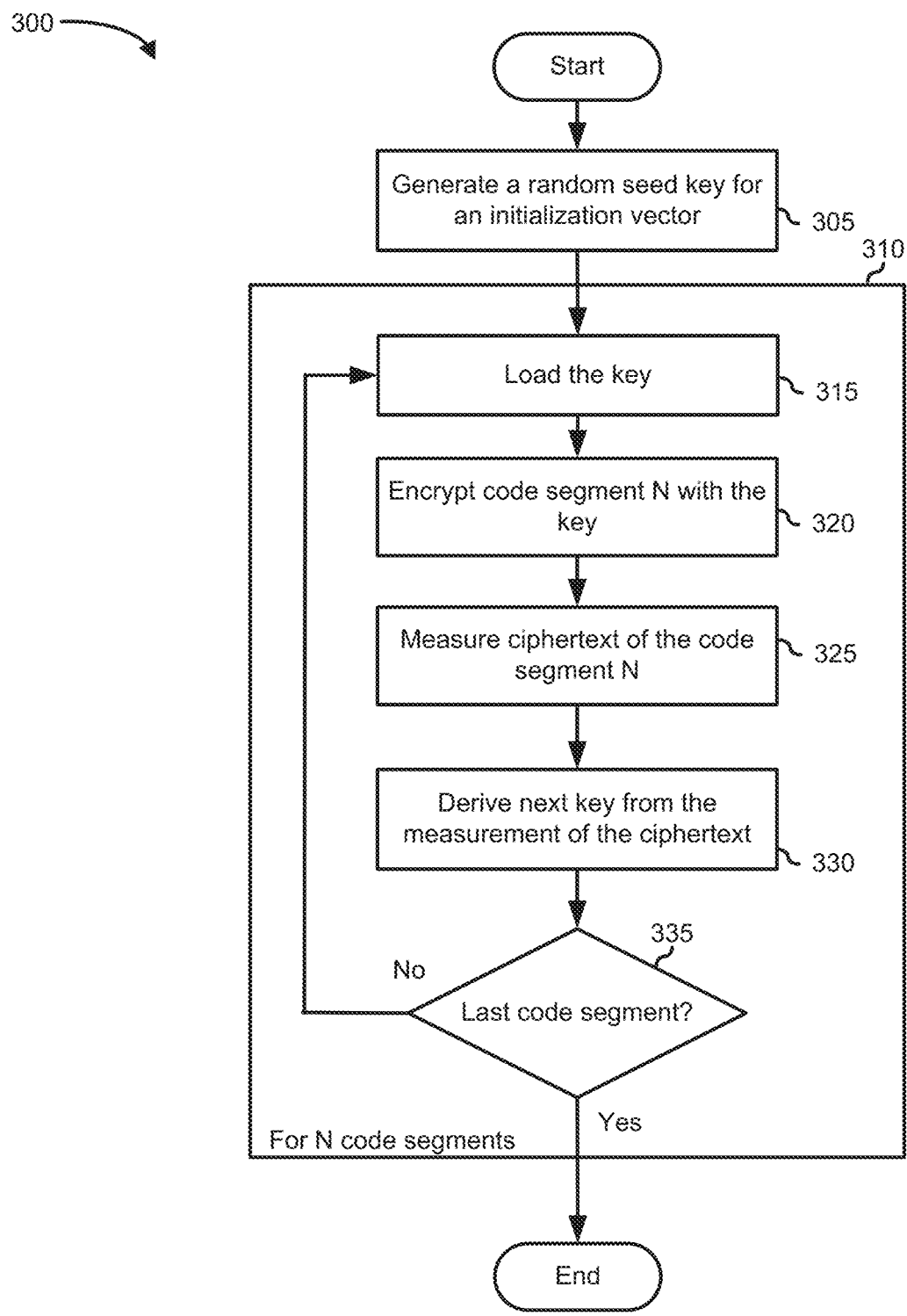
FIG. 3 is a flowchart illustrating a method for deriving encryption keys from ciphertext, according to an embodiment of the present disclosure.

FIG. 3 illustrates a method 300 for encrypting a program code or a portion thereof at build time. The encryption key is derived from the measurement of encrypted compiled program code or a portion thereof. Method 300 typically starts at block 305 where a random seed key for an initialization vector is generated. The initialization vector is an arbitrary or random number used as an input to a cryptographic primitive such as a key derivation function. The method proceeds to block 310 where a code segment is encrypted using an encryption key is derived from a hash value of the encrypted code segment except the first code segment of the program code which is encrypted with the random seed key.

Prior to block 310, the compiled program code may be divided into code segments. As used herein, a code segment may be a portion of a compiled program code such as a line, a block, a volume, a file, etc. The code segments may be arranged in order according to sequence of execution. The code segments are processed according to their sequence of execution. Assuming there is N number of code segments, the first code segment to be processed at block 310 is the first code segment to be executed. The second code segment to be processed at block 310 is the second code segment to be executed, and so on until the nth code segment is processed. Block 310 includes block 315, block 320, block 325, block 330, and decision block 335. The code segment being processed may be referred to as a current code segment. The encryption key being used or generated may be referred as a current encryption key.

Block 310 typically starts at block 315 wherein the current encryption key is loaded at the processor and is used to encrypt the current code segment at block 320. The encrypted current code segment may also be referred to as current ciphertext which is then measured at block 325. The hash value calculated from the measurement of the current ciphertext is used to derive an encryption key by a key derivation function at block 330.

The method proceeds to decision block 335 where a decision is made on whether the current code segment is the last code segment to be processed. If the current code segment is the last code segment to be processed, then the "YES" branch of decision block 335 is taken and the method 300 ends. If the current code segment is not the last code segment to be processed, then the "NO" branch of decision block 335 is taken and the method proceeds to block 315.

Figure 4:
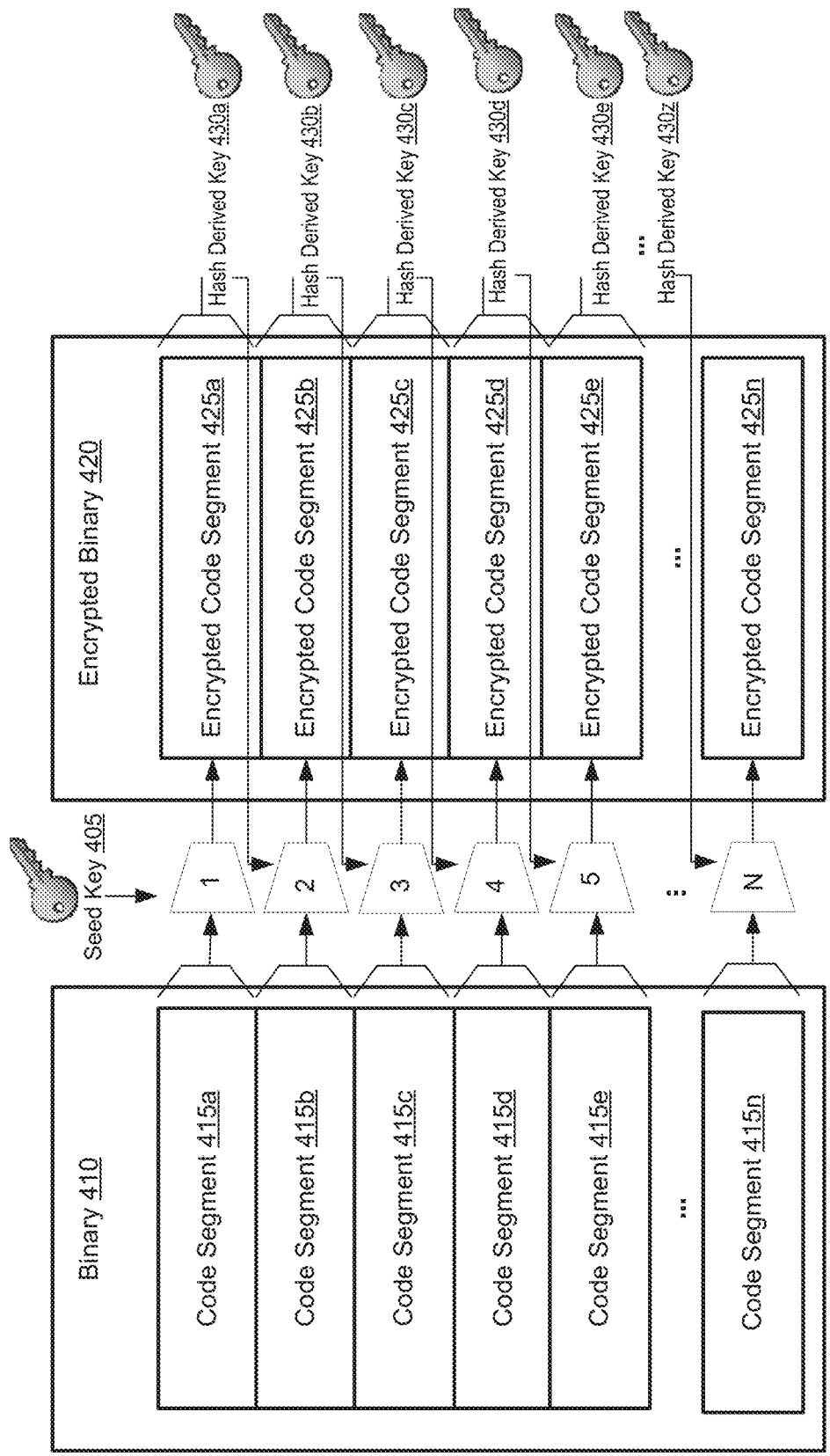
FIG. 4 is a block diagram illustrating a flow of deriving encryption keys from ciphertext, according to an embodiment of the present disclosure.

FIG. 4 shows a block diagram for encrypting a program code or portions thereof wherein the encryption key is derived from an encrypted code segment. FIG. 4 is based on block 310 of FIG. 3 and includes a seed key 405, a binary 410, an encrypted binary 420, and encryption keys also referred to as hash derived keys 430a-430n. Binary 410 includes code segments 415a-415n. Encrypted binary 420 includes encrypted code segments 425a-425n.

FIG. 4 is annotated with a series of numbers 1-N where N is equal to number of code segments. Each of these numbers represents a stage of one or more operations. Although these stages are ordered for this example, the stages illustrate one example to aid in understanding this disclosure and should not be used to limit the claims. Subject matter falling within the scope of the claims can vary with respect to the order of the operations.

Prior to stage 1, binary 410 has been divided into code segments 415a-415n. Compiled binary 410 may have been divided according to order of execution, wherein code segment 415a will be executed first, followed by code segment 415b, and then followed by code segment 415c, and so on. At stage 1, code segment 415a is encrypted using seed key 405 generating encrypted code segment 425a. Seed key 405 may be a randomly generated number generated prior to stage 1.

Hash derived key 430a may be derived or generated based on a hash value of the measurement of encrypted code segment 425a. Hash derived key 430a may then be used to encrypt code segment 415b to generate encrypted code segment 425b at stage 2. Hash derived key 430b may be generated based on the hash value of the measurement of encrypted code segment 425b. Hash derived key 430b may then be used to encrypt code segment 415c to generate encrypted code segment 425c at stage 3. Hash derived key 430c may be generated based on the hash value of the measurement of encrypted code segment 425c. Hash derived key 430c may then be used to encrypt code segment 415d to generate encrypted code segment 425d at stage 4.

Hash derived key 430d may be generated based on the hash value calculated from the measurement of encrypted code segment 425d. Hash derived key 430d may then be used to encrypt code segment 415e to generate encrypted code segment 425e at stage 5. Hash derived key 430e may be generated based on the hash value of the measurement of encrypted code segment 425e. Hash derived key 430d may then be used to encrypt a code segment, and so on. Hash derived key 430z may be generated based on the hash value calculated from the measurement of encrypted code segment prior to encrypted code segment 425n. Hash derived key 430z may then be used to encrypt code segment 415n to generate encrypted code segment 425n at stage N.

Figure 5:
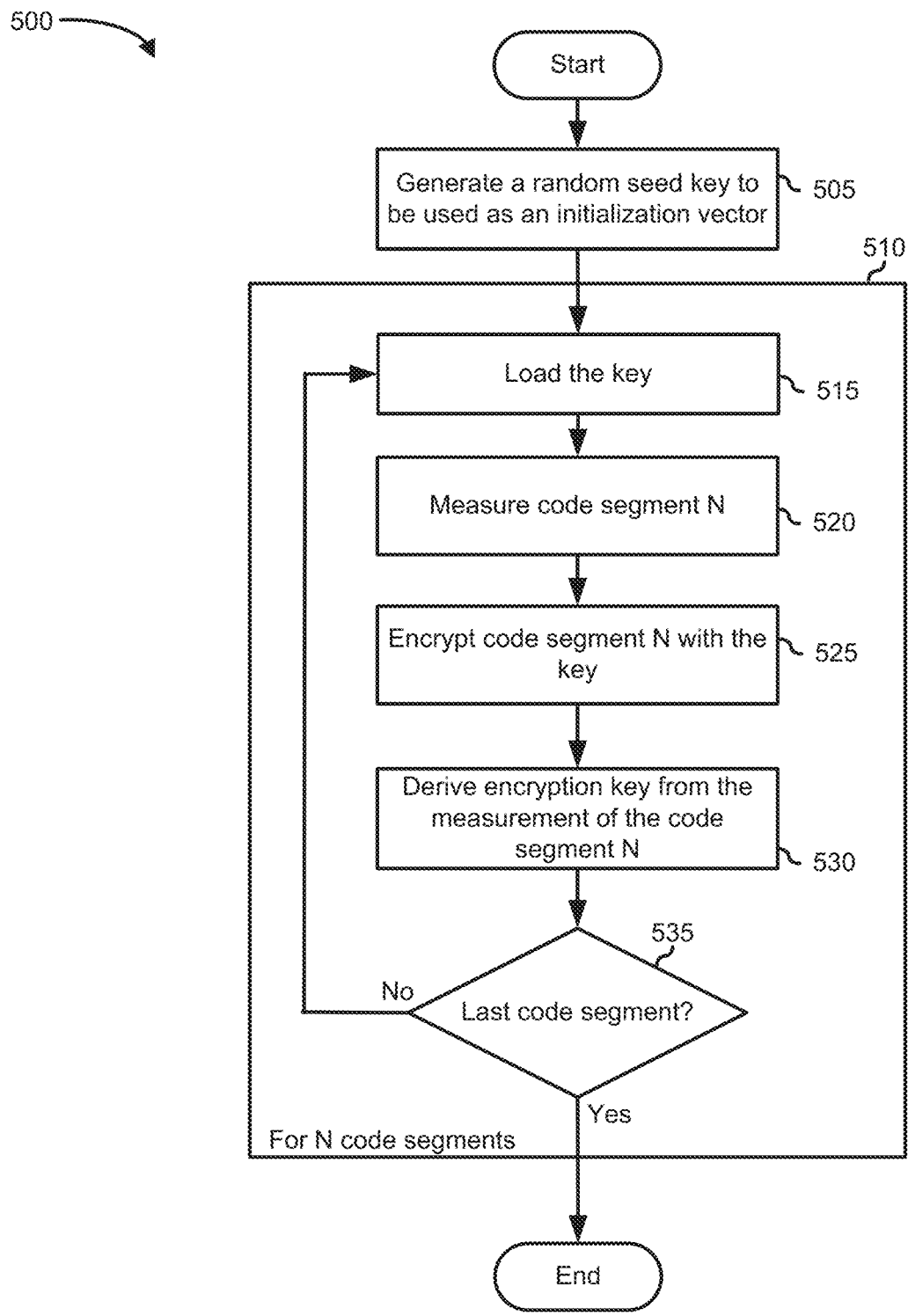
FIG. 5 is a flowchart illustrating a method for deriving encryption keys from unencrypted code segments, according to an embodiment of the present disclosure.

FIG. 5 illustrates a method 500 for encrypting compiled program code or portions thereof at build time. The encryption key is derived from the measurement of compiled program code or a portion thereof. Method 500 typically starts at block 505 where a random seed key is generated to be used as an initialization vector for a cryptographic primitive at build time. The method proceeds to block 510 is similar to block 310 of FIG. 3. Block 510 includes block 515, block 520, block 425, block 530, and decision block 535. Prior to block 510, the compiled program code may be divided into code segments which are ordered according to sequence of execution. The code segments are processed according to their sequence of execution. Assuming there is N number of code segments, the first code segment to be processed at block 310 is the first code segment to be executed.

At block 510, each code segment is encrypted using an encryption key that is derived from a hash value of a precursor code segment except for the first code segment which is encrypted with the random seed key. The nth code segment and encryption key being processed may be referred to as a current code segment and a current encryption key respectively.

Block 510 typically starts at block 515 where the current encryption key is loaded and the method proceeds to block 520. At block 520, the current code segment is measured and a hash value is generated. The method then proceeds to block 525 where the current code segment is encrypted with the current encryption key. The method proceeds to block 530 where a next encryption key is derived based on the measurement of the current code segment. The encryption key may also be derived from the seed key in addition to the measurement of the current code segment. The encryption key may be derived by using the hash value as an input to a cryptographic primitive such as a key derivation function.

After deriving the encryption key, the method proceeds to decision block 535 where a decision is made on whether the current code segment being processed is the last code segment to be processed. If the current code segment is the last code segment to be processed, then the "YES" branch of decision block 535 is taken and the method 500 ends. If the current code segment is not the last code segment to be processed, then the "NO" branch of decision block 535 is taken and the method proceeds to block 515.

Figure 6:
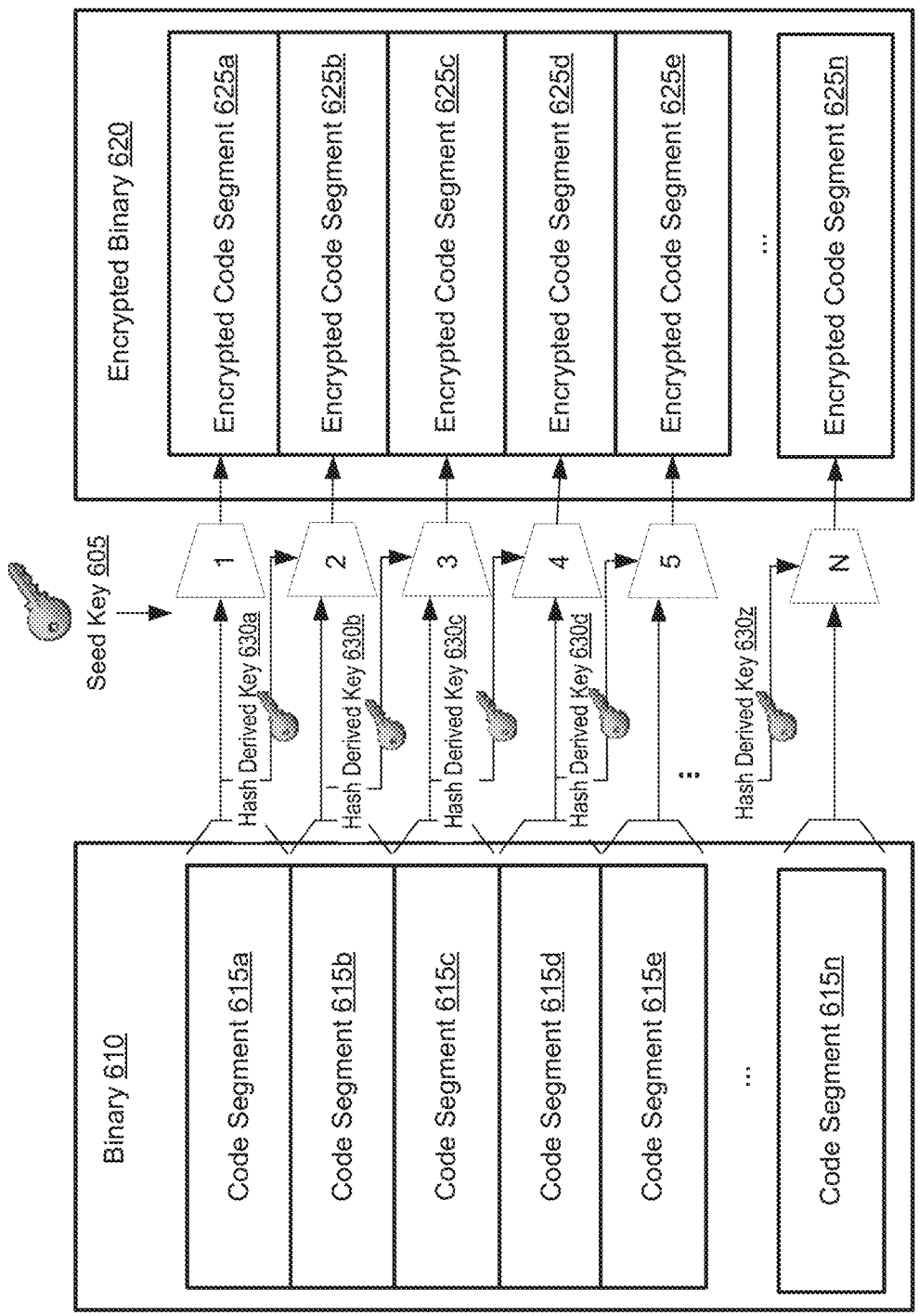
FIG. 6 is a block diagram illustrating a flow of deriving encryption keys from unencrypted code segments, according to an embodiment of the present disclosure.

FIG. 6 shows a block diagram for encryption a program code or portions thereof wherein the encryption key is derived from a code segment that is based on block 510 of FIG. 5. FIG. 6 includes a seed key 605, a binary 610, an encrypted binary 620, and encryption keys also referred to as hash derived keys 630$a$-630$n$. Binary 610 includes code segments 615$a$-615$n$. Encrypted binary 620 includes encrypted code segments 625$a$-625$n$.

FIG. 6 is annotated with a series of numbers 1-N where N is equal to number of code segments. Each of these numbers represents a stage of one or more operations. Although these stages are ordered for this example, the stages illustrate one example to aid in understanding this disclosure and should not be used to limit the claims. Subject matter falling within the scope of the claims can vary with respect to the order of the operations.

Prior to stage 1, binary 610 has been divided into code segments 615$a$-615$n$. Binary 410 may have been divided according to order of execution, wherein code segment 615$a$ will be executed first, followed by 615$b$, and then followed by 615$c$, and so on. At stage 1, code segment 615$a$ is encrypted using seed key 405 generating encrypted code segment 625$a$. Seed key 605 is a randomly generated encryption or cryptographic key which may have been generated prior to stage 1.

Hash derived key 630$a$ may be generated based on the hash value calculated from the measurement of code segment 615$a$. Hash derived key 630$a$ may then be used to encrypt code segment 615$b$ to generate encrypted code segment 625$b$ at stage 2. Hash derived key 630$b$ may be generated based on the hash value calculated from the measurement of code segment 615$b$. Hash derived key 630$b$ may then be used to encrypt code segment 615$c$ to generate encrypted code segment 625$c$ at stage 3. Hash derived key 630$c$ may be generated based on the hash value calculated from the measurement of code segment 615$c$. Hash derived key 630$c$ may then be used to encrypt code segment 615$d$ to generate encrypted code segment 625$d$ at stage 4.

Hash derived key 630$d$ may be generated based on a hash value calculated from the measurement of code segment 615$d$. Hash derived key 630$d$ may then be used to encrypt code segment 615$e$ to generate encrypted code segment 625$e$ at stage 5, and so on. Hash derived key 630$z$, which is the n−1 hash derived key, may be generated based on a hash value of the measurement of code segment 615$z$ which is the n−1 code segment. Hash derived key 630$z$ may then be used to encrypt a code segment 615$n$ to generate encrypted code segment 625$n$ at stage N.

Figure 7:
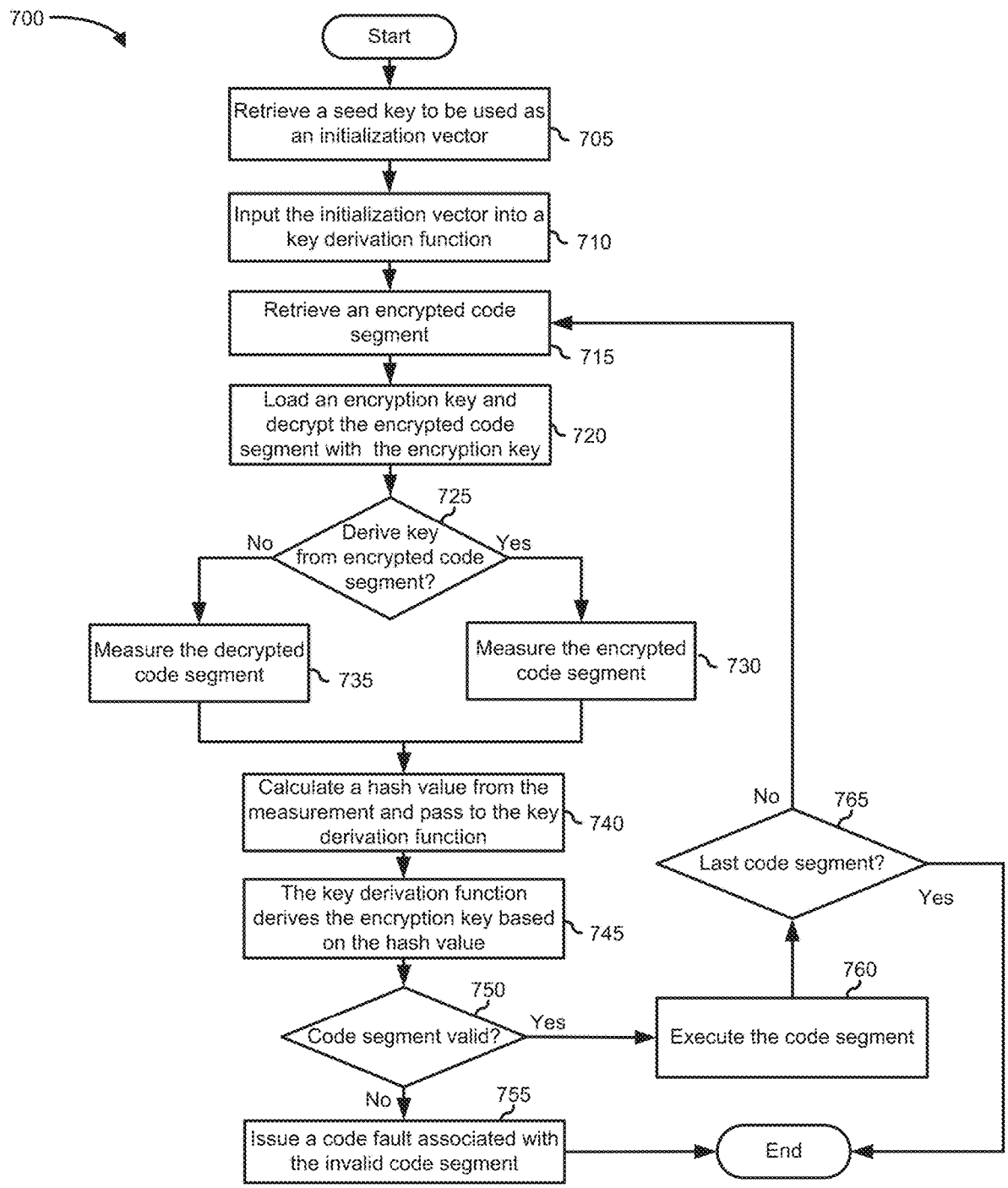
FIG. 7 is a flowchart illustrating a method for trusted control flow enforcement using encryption keys, according to an embodiment of the present disclosure.

FIG. 7 illustrates a method 700 for decrypting a program code or a portion thereof using an encryption key that is based on a measurement of a program code or portion thereof. The method 700 typically starts at block 705 where a seed key is retrieved and used as an initialization vector to a key derivation function. The seed key may have been retrieved from a storage device, a key extension register, a trusted platform module, or the like. The seed key was used to encrypt the program code or the first portion of the program code, wherein the portions are ordered in sequence of execution. Prior to block 705, a program code may have been divided into code segments and encrypted at build time. The code segments may be stored individually. In another embodiment, the program code may be encrypted and stored as one unit and each code segment retrieved at runtime.

The method proceeds to block 710 where the initialization vector is inputted to the key derivation function and the method proceeds to block 715 where the method retrieves an encrypted code segment from storage, a client, a server, a website, etc. The method proceeds to block 720, where the method loads an encryption key and decrypts the encrypted code segment with the encryption key. If the encrypted code segment is the first code segment in the sequence, then the encryption key is the seed key, otherwise the encryption key is a key derived from a measurement of one of the code segments.

The method proceeds to decision block 725 where the method determines whether to derive the encryption key from the measurement of the encrypted code segment or from the decrypted code segment. If the method determines that the encryption key is derived from the measurement of the encrypted code segment, then the "YES" branch of decision block 725 is taken and the method proceeds to block 730. If the method determines that the encryption key is derived from the measurement of the decrypted code segment, then the "NO" branch of decision block 725 is taken and the method proceeds to block 735.

At block 730, the method measures the encrypted code segment and then proceeds to block 740. At block 735, the method measures the decrypted code segment and then proceeds to block 740. At block 740, the key derivation function calculates the hash value from the measurement received and passes the hash value to the key derivation function. The method proceeds to block 745 where the key derivation function generates an encryption key based on the hash value. The encryption key may also be based on an additional input such as the initialization vector, a nonce, etc. After generating the encryption key, the method proceeds to decision block 750 where the method determines whether the decrypted code segment is valid. If the decrypted code segment is not valid, the "NO" path is taken and the method proceeds to block 755. If the decrypted code segment is valid, the "YES" path is taken and the method proceeds to block 760. The method may determine whether the code segment is valid by calculating a hash value of the decrypted code segment and comparing with it to the hash value of the code segment at build time.

At block 755, the method may issue and handle a code fault such as by terminating or halting the method, handling the fault such as by using a trigger handler, etc. Then, the method ends. The code fault may be an alphanumeric code that identifies an error associated with the decrypted code. Prior to ending, the method may remove encryption keys from the memory or storage. At block 760, the method executes the decrypted code segment. After executing the decrypted code segment, the method proceeds to decision block 765 where a decision is made on whether the current code segment being processed is the last code segment to be processed. If the current code segment is the last code segment to be processed, then the "YES" branch of decision block 765 is taken and the method ends. The method may remove the encryption keys prior to ending. If the current code segment is not the last code segment to be processed, then the "NO" branch of decision block 765 is taken and the method proceeds to block 715.

Figure 8:
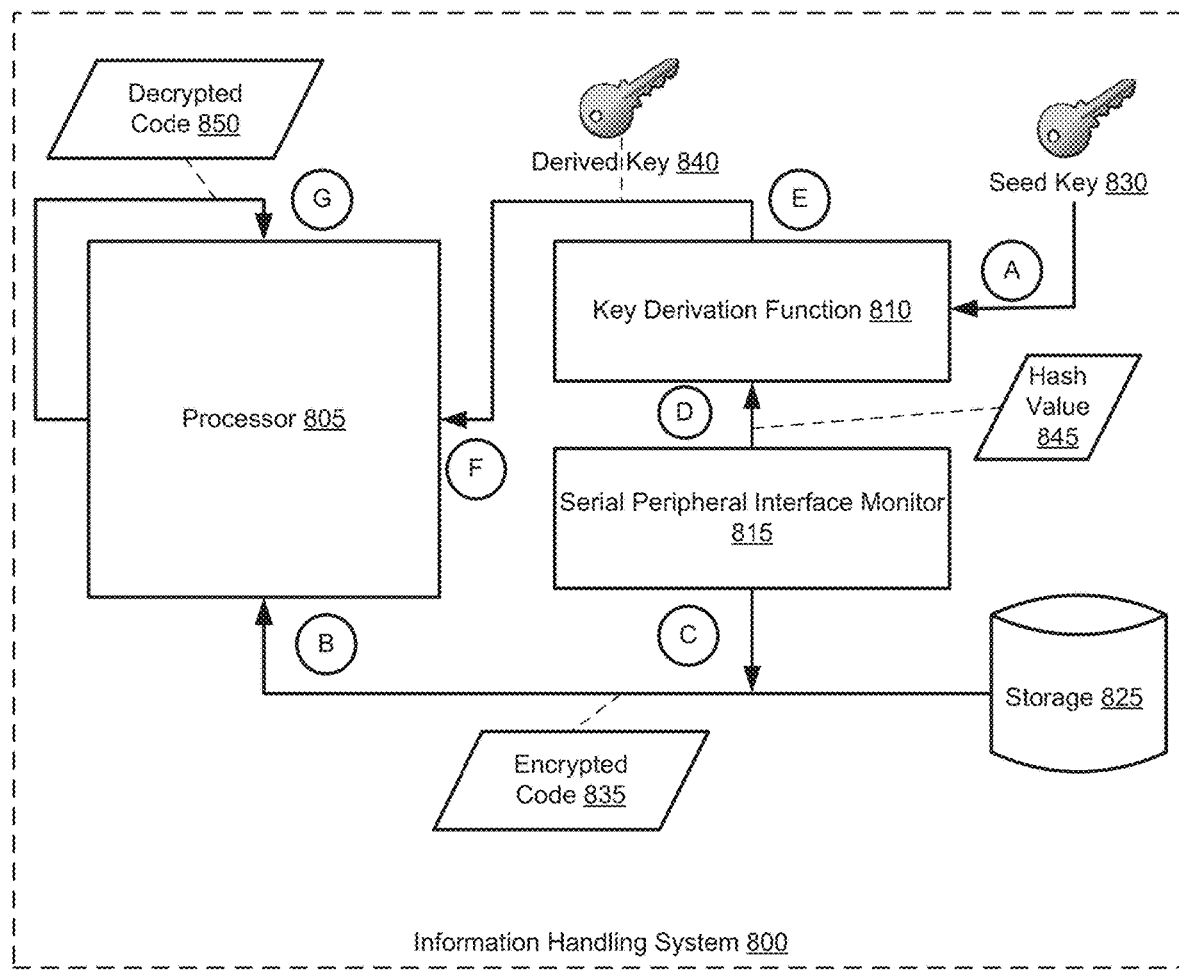
FIG. 8 is a block diagram illustrating a system for trusted control flow enforcement using derived encryption keys with an external serial peripheral interface monitor, according to an embodiment of the present disclosure.

FIG. 8 shows a block diagram of a section of an information handling system 800 for trusted control flow enforcement using derived encryption keys. Information handling system 800 is similar to information handling system 100 and includes a processor 805, a key derivation function 810, an SPI monitor 815, a storage 825, a seed key 830, and a derived key 840.

Seed key 830 may be a randomly generated key, a password, a plaintext, a timestamp, a sequence number, etc. that is used as an initial value for key derivation function 810. Key derivation function 810 is a cryptographic function that is configured to derive an encryption key based on one or more inputs. SPI monitor 815 may be configured to monitor messages transmitted over an SPI bus from storage 825 to processor 805. SPI monitor 815 may be implemented as a software or a hardware attached to the SPI bus.

FIG. 8 is annotated with a series of letters A-G. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, seed key 830 is generated using a random bit generator and used as an initial value for key derivation function 810. A salt may be added where the length of the salt may be pre-determined by the administrator and dependent on the cryptographic primitive used. For example, the administrator may set the size of seed key 830 to be at least 128 bits.

At stage B, processor 805 retrieves or fetches encrypted code 835 from storage 825. Encrypted code 835 may be the first or a next instruction to be executed by processor 805. At stage C, SPI monitor 815 watches or monitors the bus traffic over the SPI bus and detects encrypted code 835 during its transmission to processor 805.

At stage D, SPI monitor 815 may also perform measurements on of encrypted code 835 and transmits the measurements to key derivation function 810. At stage E, key derivation function 810 may generate derived key 840 based on the measurements. At stage F, processor 805 retrieves derived key 840 from key derivation function 810 and proceeds to stage G where processor 805 uses derived key 840 to decrypt encrypted code 835 resulting to decrypted code 850. Processor 805 may then execute decrypted code 850.

Figure 9:
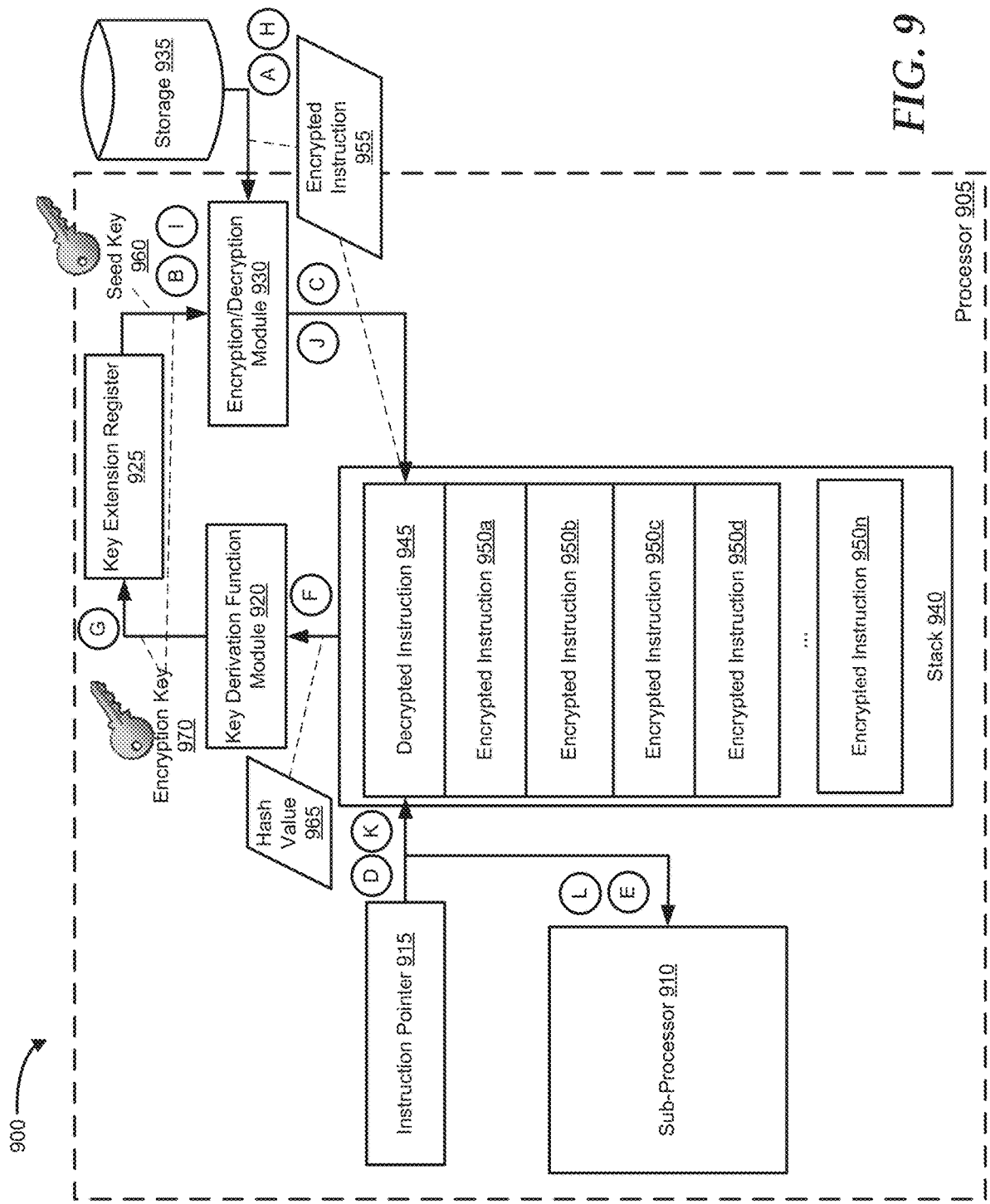
FIG. 9 is a block diagram illustrating a system for trusted control flow enforcement using derived encryption keys, according to an embodiment of the present disclosure.

FIG. 9 shows a block diagram of a section of an information handling system 900 for trusted control flow enforcement using derived encryption keys. Information handling system 900 is similar to the information handling system 100 and includes a processor 905 and a storage 935. In the current embodiment, the components for the trade control enforcement are embedded in the central processing unit. In this regard, processor 905 includes a sub-processor 910, an instruction pointer 915, a key derivation function module 920, a key extension register 925, an encryption/decryption module 930, and a stack 940. Stack 940 includes a decrypted instruction 945 and encrypted instructions 950a-950n.

Stack 940 may be configured as a theoretical data structure to illustrate the ordered sequence of execution of the program instructions. Stack 940 shows the theoretical stack after the first encrypted instruction which is encrypted instruction 955 has been decrypted resulting to decrypted instruction 945. In practice, the decrypted instruction 945 may be stored in a memory cache instead of on top of stack 940.

Stack 940 may store information about the instructions which may be used to keep track of the instructions through instruction pointer 915. As used herein, instruction pointer 915 includes an address of the current instruction that is being executed which is decrypted instruction 945. The current instruction may hold the address of the next instruction. Key extension register 925 may be configured to store seed key 960 and one or more encryption keys such as encryption key 970 providing quick access to processor 905. Key extension register 925 may further be configured to store an address for each of the stored keys. In addition, the processor or key extension register 925 may be configured to invalidate and/or delete an encryption key subsequent or prior to the execution of the decrypted code segment.

FIG. 9 is annotated with a series of letters A-K. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, processor 905 fetches or retrieves encrypted lines of code or encrypted instruction 955 from storage 935. Encrypted instruction 955 is the first instruction of a program code in stack 940 ordered in sequence of execution. At stage B, processor 905 retrieves seed key 960 from key extension register 925 and uses it to decrypt encrypted instruction 955 at stage C resulting in decrypted instruction 945 which is executed by sub-processor 910 at stage E. Prior to executing decrypted instruction 945, processor 905 may update an address of next instruction to be executed in instruction pointer 915 using the address included in decrypted instruction 945 at stage D. The next instruction to be executed is the next instruction in stack 940 which is encrypted instruction 950a.

At stage F, processor 905 measures decrypted instruction 945 and transmits hash value 965 to key derivation function module 920. Hash value 965 may be calculated from the measurement of decrypted instruction 945. At stage G, key derivation function module 920 generates encryption key 970 based from hash value 965 and loads it to key extension register 925. At stage H, processor 905 retrieves encryption key 970 from key extension register 925 to fetch the next instruction, that is encrypted instruction 950a. At stage I, processor 905 uses encryption key 970 to decrypt encrypted instruction 950a at stage J resulting in a decrypted instruction which is then executed by sub-processor 910 at stage L.

Prior to executing the decrypted instruction, processor may also update the address of the next instruction to be processed in instruction pointer 915 at stage K to point to encrypted instruction 950. This prevents out of order execution because by moving instruction pointer 915 without the right encryption key will result in trying to fetch encrypted instruction. For example, by skipping the proper sequence and fetching encrypted instruction 950b, one would not be able to decrypt instruction 950b with encryption key 970 and thus would not be able to execute the instruction. This process continues until all the instructions to be executed stack 940 are executed.

Figure 10:
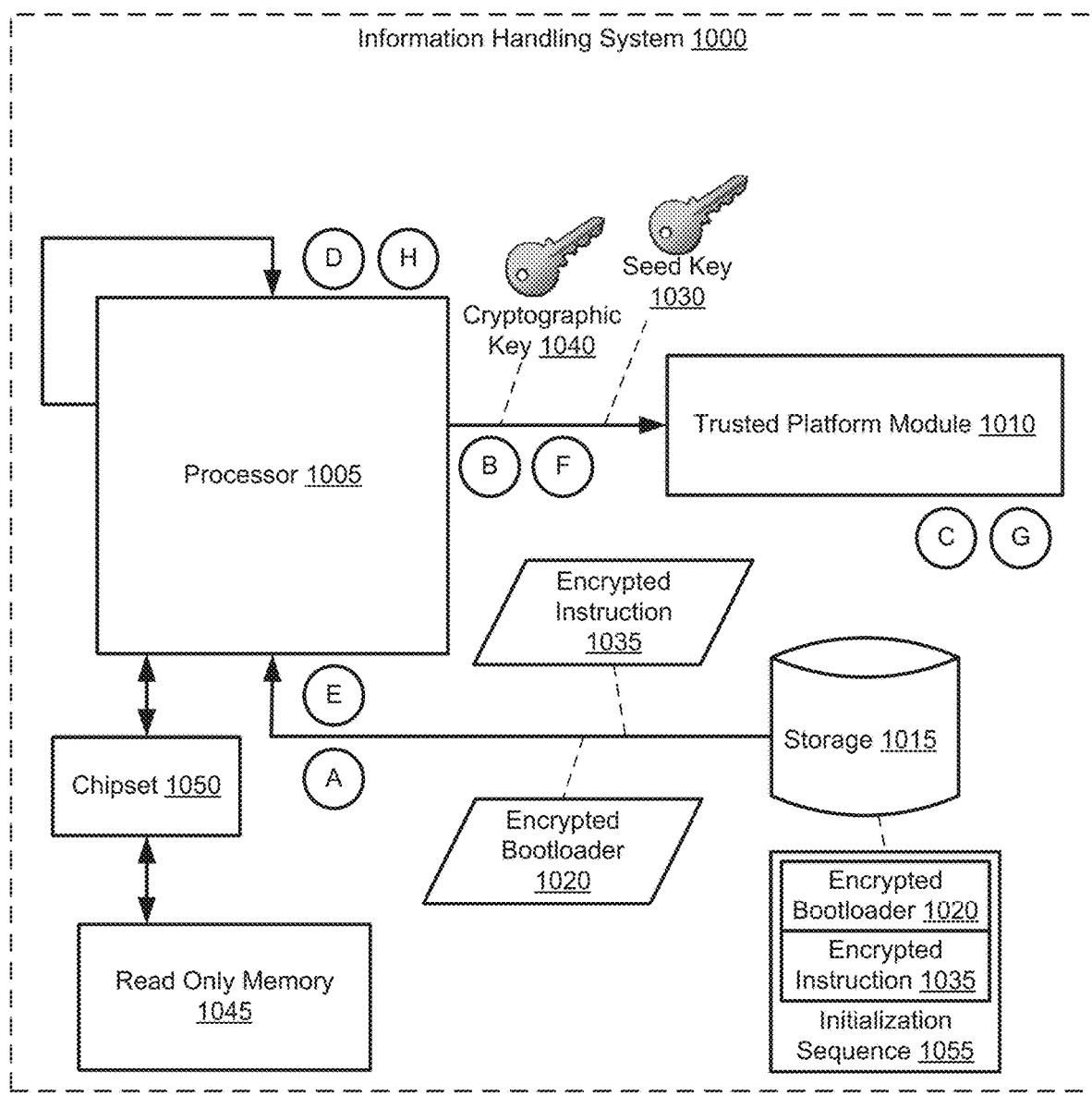
FIG. 10 is a block diagram illustrating a firmware-based system for trusted control flow enforcement using derived encryption keys with a trusted platform module, according to an embodiment of the present disclosure.

FIG. 10 shows a block diagram of a section of an information handling system 1000 for trusted control flow enforcement using derived encryption keys. Information handling system 1000 is similar to the information handling system 100. In the current embodiment, the trusted control flow enforcement leverages a trusted platform module. In this regard, information handling system 1000 includes a processor 1005, a ROM 1045, a chipset 1050, a trusted platform module 1010, and a storage 1015. Processor 1005 is coupled to ROM 1045 via chipset 1050.

Trusted platform module 1010 is a microchip configured to provide basic security-related functions primarily utilizing encryption keys. As used herein, trusted platform module 1010 may be configured to generate, store, and/or protect encryption keys such as a seed key 1030 and one or more derived encryption keys such as an encryption key 1040. The encryption keys may be hashed prior to its storage in trusted platform module 1010. The encryption key may also be sealed at trusted platform module 1010. The seal may be encrypted with the hash value of an encrypted or unencrypted program code such as encrypted bootloader 1020. The encryption key can only be decrypted or unsealed if current hash value matches the hash value used to seal the encryption key.

FIG. 10 is annotated with a series of letters A-H. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, during an initialization process, code hard-coded in ROM 1045 automatically starts running at startup and fetches encrypted bootloader 1020 from storage 1015. Storage 1015 may be an SPI flash memory. Encrypted bootloader 1020 may be the first instruction to be executed during initialization after execution of the code in ROM 1045 as shown in initialization sequence 1055. At stage B, the code in ROM 1045 transmits an initialization vector or a seed key 1030 to trusted platform module 1010. In particular, the code in ROM 1045 transmits or extends the measurement of the bootloader 1020 to a platform configuration register (PCR) such as the PCR0 of trusted platform module 1010.

At stage C, the code at ROM 1045 unseals the bootloader decryption key using PCR0 of the trusted platform module 1010 that sealed (encrypted based on the state of PCR0 after having been properly extended with the hash of the boot code) the seed key 1030. If the unseal operation is successful, the code in ROM 1045 decrypts encrypted bootloader 1020 using the unsealed seed key 1030 at stage D and executes it. Otherwise, if the unseal is not successful, the initialization process fails.

At stage E, the bootloader fetches encrypted instruction 1035 which is the next instruction as shown in initialization sequence 1055. The next instruction in the sequence may be a firmware volume, a block of code, a segment of code, etc. At stage F, the bootloader may measure the next instruction and transmit the measurement, such as the hash value of the next instruction to the trusted platform module 1010 at PCR0. At stage G, the measurement of the current encrypted instruction extended into PCR0 is used to unseal the encrypted seed key 1030. At stage H, if the unseal operation is successful; the bootloader decrypts encrypted instruction 1035 using the unsealed encryption key 1040 and executes it.

Teachings of the current disclosure may be implemented in a variety of configurations. As such the encryption/decryption point for the sequenced data and/or program instructions may depend on the implementation chosen. For example, the information handling system may operate as a standalone device to perform the functions in the current disclosure. In another example, the information handling system may be connected to other computer systems or peripheral devices, such as by a network wherein one or more of the functions may be performed by the other computer system or peripheral device.

In a networked deployment, the information handling system may operate in the capacity of a server or as a client computer system in a server-client network or as a peer computer system in a peer-to-peer network environment. Components of the systems described above are presented by way of example only and any given system may include additional or alternative components. In addition, functions of the various components may be combined and implemented in one component. For example, communication channel monitor 240 of FIG. 2 may be implemented as a function of analyzer 220 of FIG. 2. The above example illustrations refer to the control flow integrity of program codes, such as set of instructions, firmware, requests, etc. However, the current system and method may be used to enforce control flow in other types of data, via code encryption, such that the data can be re-assembled according to its initial sequence such as images, set of records, backup data files, etc. The data can be divided into segments which may include a line, a file, a block of code, a volume, etc. The kind of data and granularity of the segments of code depends on the implementation.

Although FIG. 3, and FIG. 4 show example blocks of method 300 and method 400 in some implementation, method 300 and method 400 may include additional blocks, fewer blocks, different blocks, or differently arranged blocks than those depicted in FIG. 3 and FIG. 4. Additionally, or alternatively, two or more of the blocks of method 300 and method 400 may be performed in parallel. For example, block 325 of method 300 and block 425 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A system to enforce control flow integrity, the system comprising:
    a communication channel monitor configured to:
        detect an encrypted code segment of a bootloader that is divided into a plurality of encrypted code segments; and
        calculate a hash value of the encrypted code segment based on a measurement of the encrypted code segment;
    a security module configured to:
        determine whether to derive an encryption key of a plurality of encryption keys in a memory, wherein the encryption key is based on the encrypted code segment; and
        in response to a determination to derive the encryption key from the encrypted code segment, derive the encryption key based on the hash value of the encrypted code segment; and
    a hardware processor configured to:
        decrypt the encrypted code segment with a seed key retrieved from a storage device resulting in the decrypted code segment;
        determine whether the decrypted code segment is a last code segment of the encrypted code segments;
        while being determined that the decrypted code segment is not the last code segment:
            retrieve a next encrypted code segment for execution after the encrypted code segment according to a sequence of execution;
            decrypt the next encrypted code segment with the encryption key generating a next decrypted code segment;
            if the decryption of the encrypted code segment is successful then execute the next decrypted code segment; and
            deriving the encryption key based on a next hash value of the next encrypted code segment; and
        in response a determination that the next decrypted code segment is the last code segment, remove the encryption keys from the memory.

2. The system of claim 1, wherein a key extension register holds the seed key and the encryption key.

3. The system of claim 1, wherein the storage device is a trusted platform module.

4. The system of claim 3, wherein the retrieve of the next encrypted code segment includes to unseal the seed key using platform configuration register of the trusted platform module.

5. The system of claim 1, wherein the encryption key is derived from the hash value of the encrypted code segment.

6. The system of claim 1, wherein the hardware processor is further configured to invalidate the encryption key subsequent to the execution of the decrypted code segment.

7. The system of claim 1, wherein the encrypted code segments are stored in a serial peripheral interface flash memory device.

8. The system of claim 1, wherein the hardware processor is further configured to determine whether decryption of the next encrypted code segment is unsuccessful, if decryption is unsuccessful then terminate execution of the decrypted code segment.

9. A method comprising:
    detecting, by a hardware processor, an encrypted code segment of a bootloader that is divided into a plurality of encrypted code segments;
    calculating a hash value of the encrypted code segment based on a measurement of the encrypted code segment;
    determining whether to derive an encryption key of a plurality of encryption keys in a memory, wherein the encryption key is based on the encrypted code segment;
    in response to a determination to derive the encryption key from the encrypted code segment, deriving the encryption key based on the hash value of the encrypted code segment;
    decrypting the encrypted code segment with a seed key retrieved from a storage device resulting in a decrypted code segment;
    if the decrypting of the encrypted code segment is successful, then executing the decrypted code segment;
    determining whether the decrypted code segment is a last code segment of the encrypted code segments;
    while determining that the decrypted code segment is not the last code segment:
        retrieving a next encrypted code segment for execution according to a sequence of execution;
        decrypting the next encrypted code segment with the encryption key generating a next decrypted code segment;
        deriving the encryption key based on a next hash value of the next encrypted code segment; and if the decrypting of the next encrypted code segment is successful then executing the next decrypted code segment; and in response to determining that the next decrypted code segment is the last code segment, removing the encryption keys from the memory.

10. The method of claim 9, wherein a key extension register holds the seed key and the encryption key.

11. The method of claim 9, wherein the storage device is a trusted platform module.

12. The method of claim 11, wherein the retrieving includes the hardware processor further configured to unseal the seed key using platform configuration register of the trusted platform module.

13. The method of claim 9, wherein the encryption key is derived from the hash value of the encrypted code segment.

14. The method of claim 9, wherein the hardware processor is further configured to invalidate the encryption key subsequent to execution of the next decrypted code segment.

15. The method of claim 9, wherein the encrypted code segments are stored in a serial peripheral interface flash memory device.

16. The method of claim 9, wherein the hardware processor is further configured to determine if decryption of the next encrypted code segment is unsuccessful, when decryption is unsuccessful then to terminate execution of the next decrypted code segment.

17. A non-transitory computer-readable medium including code that when executed causes a processor to perform a method, the method comprising:

detecting an encrypted code segment of a plurality of encrypted code segments;

calculating a hash value of the encrypted code segment based on a measurement of the encrypted code segment, wherein the encrypted code segment is a bootloader;

determining whether to derive an encryption key of a plurality of encryption keys in a memory, wherein the encryption key is based on the encrypted code segment;

in response to a determination to derive the encryption key from the encrypted code segment, deriving the encryption key based on the hash value of the encrypted code segment;

decrypting the encrypted code segment with a seed key retrieved from a storage device resulting in the first a decrypted code segment;

if the decrypting is successful, then executing the decrypted code segment;

determining whether the first decrypted code segment is a last code segment of the encrypted code segments;

while determining that the decrypted code segment is not the last code segment:

retrieving a next encrypted code segment for execution according to a sequence of execution;

decrypting the next encrypted code segment with the encryption key generating a next decrypted code segment;

if the decrypting of the next encrypted code segment is successful then executing the next decrypted code segment; and deriving the encryption key based on a next hash value of the next encrypted code segment; and in response determining that the decrypted code segment is the last code segment, remove the encryption keys from the memory.

18. The non-transitory computer-readable medium of claim 17, wherein a key extension register holds the seed key and the encryption key.

19. The non-transitory computer-readable medium of claim 17, wherein the storage device is a trusted platform module.

20. The non-transitory computer-readable medium of claim 17, wherein the encryption key is derived from the hash value of the encrypted code segment.

* * * * *